United States Patent [19]

Jäger

[11] Patent Number: 4,820,457
[45] Date of Patent: Apr. 11, 1989

[54] APPARATUS FOR AERATING WATER

[75] Inventor: Sebastian Jäger, Burgdorf, Fed. Rep. of Germany

[73] Assignee: Arnold Jäger, Burgdorf, Fed. Rep. of Germany

[21] Appl. No.: 92,046

[22] Filed: Sep. 2, 1987

[30] Foreign Application Priority Data

Sep. 2, 1986 [DE] Fed. Rep. of Germany ....... 3629786

[51] Int. Cl.$^4$ .............................................. B01F 3/04
[52] U.S. Cl. .................................. 261/120; 210/242.2; 261/122; 261/123; 261/124
[58] Field of Search ................. 261/77, 120, 122, 124, 261/123, DIG. 75; 210/242.2

[56] References Cited

U.S. PATENT DOCUMENTS

| | | | |
|---|---|---|---|
| 2,718,275 | 9/1955 | Banks | 261/122 X |
| 3,193,260 | 7/1965 | Lamb | 261/120 X |
| 3,318,098 | 5/1967 | Hoddinott et al. | 261/124 X |
| 3,452,966 | 7/1969 | Smolski | 261/77 |
| 3,758,083 | 9/1973 | Palmer | 261/120 X |
| 3,846,517 | 11/1974 | Ross | 261/120 X |
| 4,026,527 | 5/1977 | Costen | 261/123 X |
| 4,107,240 | 8/1978 | Verner et al. | 261/120 X |
| 4,215,082 | 7/1980 | Danel | 261/120 X |
| 4,421,696 | 12/1983 | Grave et al. | 261/124 X |
| 4,436,675 | 3/1984 | Hisao et al. | 210/242.2 X |

FOREIGN PATENT DOCUMENTS 824376 11/1959 United Kingdom ................ 261/124
942754 11/1963 United Kingdom ....... 261/DIG. 75

Primary Examiner—Richard L. Chiesa
Attorney, Agent, or Firm—Becker & Becker, Inc.

[57] ABSTRACT

An apparatus for aerating water with aeration heads that are fed from a common feed line. In order to achieve an intensive, uniform aeration even when the common line is disposed on an uneven surface, a flexible line is provided as a connection between each aeration head and the common feed line. This connection line can be a rubber hose, and can be relieved from tension by a steel cable.

8 Claims, 1 Drawing Sheet

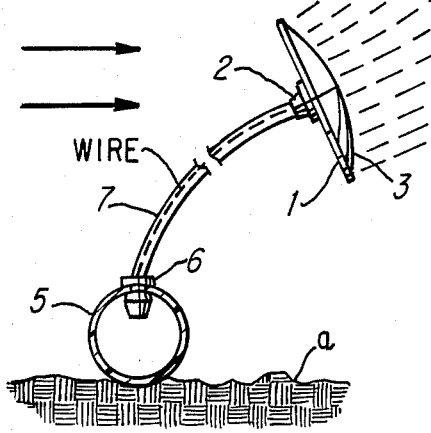
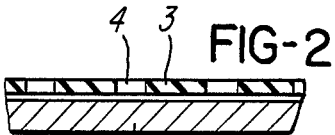
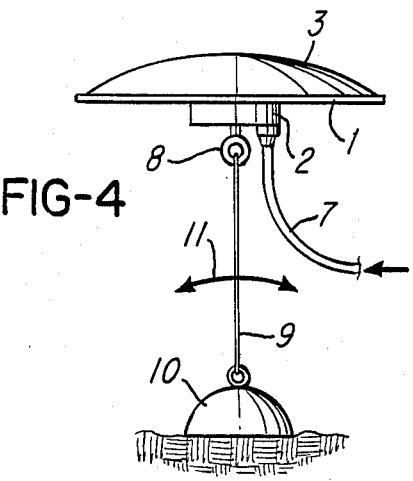
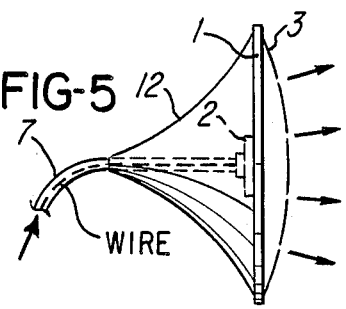
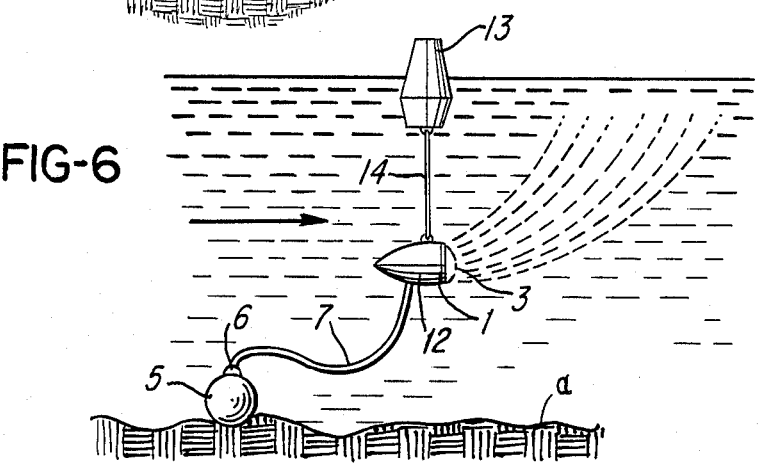

APPARATUS FOR AERATING WATER

BACKGROUND OF THE INVENTION

The present invention relates to an apparatus for aerating water with aeration heads that are fed from a collecting pipe or common line.

Aeration heads that are used for such apparatus generally comprise a disk that is provided for a rubber covering. The latter receives compressed air, and delivers the air to the water via narrow slits. These slits spread as a result of internal pressure, and close again when this pressure is reduced.

The heretofore known apparatus of this general type can have difficulties in flowing water because the aeration heads are fixedly connected to the distribution pipes, i.e. to the common line, which must, of course, be lower to the bottom of the body of water. It is to be understood that under these conditions it is not possible to have a uniform aeration if the common line, along with the plurality of aeration heads that are provided, are disposed at different depths. The deeper aeration heads are practically without effect, because the compressed air will discharge from the higher aeration heads, which have a lower counterpressure.

It is an object of the present invention to improve an apparatus of the aforementioned general type in such a way that a satisfactory aeration is achieved even when the support surface for the common line is uneven.

BRIEF DESCRIPTION OF THE DRAWING

This object, and other objects and advantages of the present invention, will appear more clearly from the following specification in conjunction with the accompanying schematic drawing, in which:

FIG. 1 is a view that shows one exemplary embodiment of the inventive aerating apparatus in a flowing body of water;

FIG. 2 is a partial cross-sectional view through the aeration head of the apparatus of FIG. 1;

FIG. 3 is a plan view of the aeration head of FIG. 2;

FIG. 4 is a view that shows a second exemplary embodiment of the inventive aeration apparatus;

FIG. 5 is a side view of an inventive aeration apparatus in operation; and

FIG. 6 is a view that shows a further exemplary embodiment of the inventive aeration apparatus.

SUMMARY OF THE INVENTION

Pursuant to the present invention, the aeration heads are closed, i.e. connected to the collecting pipe or common feed line, via a flexible line, for example via a hose of rubber or the like. Not only can the length of these hoses be adjusted to various water depths, such hoses also permit transverse movements of the aeration heads by letting the latter be deflected to the side by the stream of water. As a result, a far better aeration effect is achieved, especially with disklike aeration heads.

The present invention also offers the possibility of being able to anchor the aeration heads via means other than the feed common line. For example, it is possible to provide relief of tension on the flexible connection offered by the flexible hose by holding the aeration head either to an anchor or other weight via a cable, such as a draw cable, or from the surface of the water by a float or buoy. All of these anchoring measures can be undertaken independent of the depth of the common feed line and the condition of the subsurface or bed of the river or other body of water.

Deflectors, fins, etc. can also be provided that utilize the flow of the water to dynamically position the aeration heads. Also with respect to the water flow, it can be expedient to provide the aeration head with a streamlined or tier-like configuration. For example, the back of the aeration head can have a conical or rounded shape so that when the aerator is in the water, no fluttering or wobbling movements are carried out, although transverse movements in the form of slow pendulum or swinging movements can be advantageous for uniformly distributing the discharging air.

Further specific features of the present invention will be described in detail subsequently.

DESCRIPTION OF PREFERRED EMBODIMENTS

Referring now to the drawing in detail, the aeration head essentially comprises a rigid disk 1 having an approximately circular contour. Compressed air is supplied to the center of the back of the disk 1 via a fitting 2. Disposed on the front of the disk 1 is a thin rubber sheet 3 that is provided with a number of small slits 4. By opening, these slits 4 deliver air to the water. The slits close again when no more air is supplied to them. The rubber sheet 3 naturally bulges toward the front in a spherical manner under the effect of the air.

Disposed on the irregular bed "a" of a river, etc. is a common line 5, which could, for example, be made of plastic. The line 5 leads to an air compressor, and is provided with a number of the illustrated aeration heads. It is to be understood that where rivers or streams are to be aerated, the common line 5 is expediently disposed transverse to the flow.

A hose 7 of rubber or the like is connected to the common line 5 via a fitting 6; the free end of the hose 7 is fixedly connected to the aeration head. The lengths of the hoses 7, which are distributed over the length of a line 5, vary and are determined in conformity to the depth of the water. This connection of the aeration head has the further effect that the head can shift under the effect of the flowing water. The aeration head thus assumes an inclined position, approximately as illustrated in FIG. 1, as a result of which the air bubbles can exit in an effective manner. and an increased diffusion is achieved.

Moreover, the aeration head can carry out pendulum or swinging movements in a direction transverse to the flow in order to cover a larger area. The inclined position of FIG. 1 also has the advantage that the rubber sheet 3 can to a large extent be kept free of foreign bodies that are carried along by the water.

To relieve the tension on the hose 7, in the embodiment of FIG. 4 the disk 1 is provided with a bracket or fitting 8 for fastening to a pull-resistant cable 9 that is secured to a weight 10 on the bottom. This type of anchoring permits pendulum or swinging movements in the direction of the double arrow 11.

In order with stronger flows to prevent greater stresses, and possibly even fluttering or wobbling of the aeration head, the back side of the latter is provided with a conical fairing 12. The aeration head thus offers little resistance to the flowing water; at the same time, larger foreign bodies are deflected.

In order to achieve a relatively precise adjustment of the height of the aeration head, the weighted aeration head is suspended on a buoy 13 via a guy line 14. Air is supplied via the hose 7, which is connected below to the common line 5.

It should be noted that the hose 7 can also be pull-resistant, for example by disposing a wire or the like therein, in order to free the flexible rubber or the like for the hose body to a large extent from the effect of tension.

The hose 7 is preferably connected not only to the line 5 but also to the aeration head, i.e. the fitting 2 thereof, via a plug connection, so that a rapid assembly can be carried out and so that it would also be possible to rapidly use and exchange hoses 7 of various lengths.

It would also be possible to embody the various fastening elements, including the hose 7, the cable 9, and the guy line 14, in such a way that the length thereof can be varied.

The present invention is, of course, in no way restricted to the specific disclosure of the specification and drawing, but also encompasses any modifications within the scope of the appended claims.

What is claimed is:

1. An apparatus for aerating water, comprising:
   a common feed line that is connected to a source of air; and
   a plurality of aeration heads that are each connected to said feed line, for receiving air therefrom, via a respective flexible line,
   each aeration head having a disk-like configuration,
   said flexible connecting line being a hose that is provided with pull-resistant inserts that extend in the longitudinal direction of said hose,
   said aeration head essentially comprising a rigid disk having a back side that is connected to said flexible line via a fitting, and a front side on which is disposed a thin rubber sheet that has a number of small and very narrow slits for the discharge of air,
   said feed line being disposed at least near the bed of a body of water, and each of said aeration heads being disposed above said feed line,
   each aeration head can be moved in the direction of, and/or transverse to the direction of, said feed line,
   said aeration head being disposed above said feed line in such a way that it floats and can swing.

2. An apparatus according to claim 1, in which said aeration head is anchored to weighting means via a substantially inextensible cable.

3. An apparatus according to claim 1, in which said aeration head is supported by a buoy via a flexible, substantially inextensible support member.

4. An apparatus according to claim 1, in which said aeration head has a front side for the discharge of air, and a back side with a conical or otherwise rounded configuration.

5. An apparatus according to claim 1, in which said aeration head is provided with fins or deflectors.

6. An apparatus according to claim 1, in which said flexible line has two ends, one connected to said feed line, the other to said aeration head, with at least one of said ends being connected to its part via a plug connection.

7. An apparatus according to claim 1, in which the length of said flexible line can be varied.

8. An apparatus according to claim 1, in which each aeration head can move back and forth in an essentially horizontal direction.

* * * * *